United States Patent [19]

Ohta et al.

[11] Patent Number: 5,621,542

[45] Date of Patent: Apr. 15, 1997

[54] IMAGE PROCESSING APPARATUS AND METHOD WITH WEIGHTING OF ERROR DATA GENERATED IN QUANTIZATION

[75] Inventors: Takatoshi Ohta; Koji Yamada, both of Yokohama, Japan

[73] Assignee: Canon Kabushiki Kaisha, Tokyo, Japan

[21] Appl. No.: 373,843

[22] Filed: Jan. 18, 1995

[30]   Foreign Application Priority Data

| Jan. 20, 1994 | [JP] | Japan | 6-004647 |
| Jul. 14, 1994 | [JP] | Japan | 6-162094 |

[51] Int. Cl.$^6$ .................................................. H04N 1/405
[52] U.S. Cl. ........................................... 358/455; 358/456
[58] Field of Search .......................... 358/443, 447, 358/455–456, 298; 382/252; H04N 1/405

[56]               References Cited

U.S. PATENT DOCUMENTS

| 4,680,645 | 7/1987 | Dispoto et al. | 358/298 |
| 5,201,013 | 4/1993 | Kumagai | 358/456 |
| 5,307,426 | 4/1994 | Kanno et al. | 358/456 |
| 5,530,561 | 6/1996 | Shimazaki | 358/455 |

FOREIGN PATENT DOCUMENTS

| 0272147 | 6/1988 | European Pat. Off. . |
| 0576786 | 1/1994 | European Pat. Off. . |
| 58-215169 | 12/1983 | Japan . |
| 61-52073 | 3/1986 | Japan . |
| 61-293068 | 12/1986 | Japan . |
| 63-35074 | 2/1988 | Japan . |
| 63-155950 | 6/1988 | Japan . |

OTHER PUBLICATIONS

R. Floyd and L. Steinberg, "An Adaptive Algorithm for Spatial Grey Scale", Society for Information Display 1975 Symposium Digest of Technical Papers (1975), pp. 36–37.

*Primary Examiner*—Kim Vu
*Attorney, Agent, or Firm*—Fitzpatrick, Cella, Harper & Scinto

[57]               ABSTRACT

An image processing apparatus comprises an inputting unit for inputting image data, a processing unit for quantizing the image data, and a distributing unit for weighting error data which occurs at the time of the quantizing process and for distributing the error data to a plurality of image data, wherein the distributing unit sets a value of a round error which occurs by the weighting process to a value which lies within a range from 0 to less than 1.

14 Claims, 11 Drawing Sheets

FIG. 2A

ERROR DISTRIBUTION WINDOW IN CASE OF PROC IN "→" DIRECTION

FIG. 2B

ERROR DISTRIBUTION WINDOW IN CASE OF PROC IN "←" DIRECTION

FIG. 3

EXAMPLE OF ERROR DISTRIBUTION COEFFICIENT

| | | $\frac{128}{256}$ |
|---|---|---|
| $\frac{20}{256}$ | $\frac{37}{256}$ | $\frac{71}{256}$ |

(with * in the top-middle cell)

|   | e0 | e1 | e2 | e3 | o |
|---|---|---|---|---|---|
| 0 | 0 | 0 | 0 | 0 | 0 |
| 1 | 128 | 71 | 37 | 20 | 0 |
| 2 | 256 | 142 | 74 | 40 | 0 |
| ⋮ | ⋮ | ⋮ | ⋮ | ⋮ | ⋮ |
| 127 | 16256 | 9017 | 4699 | 2540 | 0 |
| 128 | −16384 | −9088 | −4736 | −2560 | 1 |
| ⋮ | ⋮ | ⋮ | ⋮ | ⋮ | ⋮ |
| 255 | 0 | 0 | 0 | 0 | 1 |
| ⋮ | ⋮ | ⋮ | ⋮ | ⋮ | ⋮ |
| 383 | 16384 | 9088 | 4736 | 2560 | 1 |
| −128 | −16384 | −9088 | −4736 | −2560 | 1 |
| ⋮ | ⋮ | ⋮ | ⋮ | ⋮ | ⋮ |
| −2 | −256 | −142 | −74 | −40 | 0 |
| −1 | −127 | −71 | −37 | −20 | 0 |

EXAMPLE OF ERROR DISTRIBUTION COEFFICIENT

|      | e0    | e1    | e2    | e3    | o0 | o1 |
|------|-------|-------|-------|-------|----|----|
| 0    | 0     | 0     | 0     | 0     | 0  | 0  |
| 1    | 128   | 71    | 37    | 20    | 0  | 0  |
| 2    | 256   | 142   | 74    | 40    | 0  | 0  |
| ⋮    | ⋮     | ⋮     | ⋮     | ⋮     | ⋮  | ⋮  |
| 63   | 8064  | 4473  | 2331  | 1260  | 0  | 0  |
| 64   | -8192 | -4544 | -2368 | -1280 | 1  | 0  |
| ⋮    | ⋮     | ⋮     | ⋮     | ⋮     | ⋮  | ⋮  |
| 127  | -128  | -71   | -37   | -20   | 1  | 0  |
| 128  | 0     | 0     | 0     | 0     | 1  | 0  |
| ⋮    | ⋮     | ⋮     | ⋮     | ⋮     | ⋮  | ⋮  |
| 191  | 8064  | 4473  | 2331  | 1260  | 0  | 1  |
| 192  | -8064 | -4473 | -2331 | -1260 | 0  | 1  |
| ⋮    | ⋮     | ⋮     | ⋮     | ⋮     | ⋮  | ⋮  |
| 255  | 0     | 0     | 0     | 0     | 0  | 1  |
| 256  | 128   | 71    | 37    | 20    | 0  | 1  |
| ⋮    | ⋮     | ⋮     | ⋮     | ⋮     | ⋮  | ⋮  |
| 318  | 8064  | 4473  | 2331  | 1260  | 0  | 1  |
| -64  | -8192 | -4544 | -2368 | -1280 | 0  | 0  |
| ⋮    | ⋮     | ⋮     | ⋮     | ⋮     | ⋮  | ⋮  |
| -1   | -128  | -71   | -37   | -20   | 0  | 0  |

FIG. 10

|     | e0    | e1    | e2    | e3    | o0 | o1 |
|-----|-------|-------|-------|-------|----|----|
| 0   | 0     | 0     | 0     | 0     | 0  | 0  |
| 1   | 128   | 71    | 37    | 20    | 0  | 0  |
| 2   | 256   | 142   | 74    | 40    | 0  | 0  |
| ⋮   | ⋮     | ⋮     | ⋮     | ⋮     | ⋮  | ⋮  |
| 63  | 8064  | 4473  | 2331  | 1260  | 0  | 0  |
| 64  | −8192 | −4544 | −2368 | −1280 | 1  | 0  |
| ⋮   | ⋮     | ⋮     | ⋮     | ⋮     | ⋮  | ⋮  |
| 127 | −128  | −71   | −37   | −20   | 1  | 0  |
| 128 | 0     | 0     | 0     | 0     | 1  | 0  |
| ⋮   | ⋮     | ⋮     | ⋮     | ⋮     | ⋮  | ⋮  |
| 191 | 8064  | 4473  | 2331  | 1260  | 1  | 1  |
| 192 | −8064 | −4473 | −2331 | −1260 | 1  | 1  |
| ⋮   | ⋮     | ⋮     | ⋮     | ⋮     | ⋮  | ⋮  |
| 255 | 0     | 0     | 0     | 0     | 1  | 1  |
| 256 | 128   | 71    | 37    | 20    | 1  | 1  |
| ⋮   | ⋮     | ⋮     | ⋮     | ⋮     | ⋮  | ⋮  |
| 318 | 8064  | 4473  | 2331  | 1260  | 1  | 1  |
| −64 | −8192 | −4544 | −2368 | −1280 | 0  | 0  |
| ⋮   | ⋮     | ⋮     | ⋮     | ⋮     | ⋮  | ⋮  |
| −1  | −128  | −71   | −37   | −20   | 0  | 0  |

IMAGE PROCESSING APPARATUS AND METHOD WITH WEIGHTING OF ERROR DATA GENERATED IN QUANTIZATION

BACKGROUND OF THE INVENTION

1. Field of the Invention

The present invention relates to an image processing method and apparatus and, more particularly, to an image processing method and apparatus for quantizing input data to binary or multi-value data while preserving a difference between an input image density and an output image density or the like by an error diffusion method or the like.

2. Related Background Art

Hitherto, an error diffusion method is known as a pseudo half tone process for expressing input multi-value data by multi-values of levels smaller than those of binary or input multi-value data. The error diffusion method has been proposed in "An Adaptive Algorithm for Spatial Gray Scale", the Society for Information Display 1975 Symposium Digest of Technical Papers, 36, 1975. According to the above method, when it is assumed that a target pixel is set to (P) and a density of the pixel is equal to (v) and the densities of non-binarized pixels P0, P1, P2, and P3 around the point (P) are equal to v0, v1, v2, and v3, and a threshold for binarization is set to (T), a binarization error (E) at the target point (P) is weighted by coefficients W0, W1, W2, and W3 which were experientially obtained, and the resultant weighted errors are allocated to the peripheral pixels P0, P1, P2, and P3, thereby equalizing the average density of an output image with the density of the input image in a macro manner. In this instance, when output binary data assumes (o), errors E0, E1, E2, and E3 for the peripheral pixels P0, P1, P2, and P3 can be obtained by the following equations.

When $v \geq T$, $o=1$, $E=v-V_{max}$

When $v<T$, $o=0$, $E=v-V_{min}$ (equation 1)

(where, Vmax: maximum density, Vmin: minimum density)

$E0 = E \times W0$ $E1 = E \times W1$ $E2 = E \times W2$ $E3 = E \times W3$ (Example of the weight coefficients: W0=7/16, W1=1/16, W2=5/16, W3=3/16)

When the above method is realized by a logic circuit, however, as will be understood from the above-mentioned example, there are drawbacks such that since a multiplier and a divider are necessary for every weight coefficient, the circuit scale is large, and that when an integer arithmetic operation is executed, the average density of the output image is not equal to the density of the input image because of a round error [E-(E0+E1+E2+E3)].

As a method to solve such drawbacks, methods of reducing the circuit scale by using a shift register in place of the multiplier and divider by setting into a fraction of the power of 2 of the weight coefficient have been disclosed in the Official Gazettes of Japanese Patent Application Laid-open Nos. 58-215169, 61-52073, and 61-293068. A method such that a value of a preliminarily weighted binary error is determined for every value of density information and the sum of the values is equalized to the binary error, thereby simplifying the multiplication and division and eliminating a round error has also been proposed in Japanese Patent Application Laid-open No. 63-35074.

A method of equalizing the average density of an output image to the density of an input image by adding a round error to the weighted peripheral pixels has also been proposed in Japanese Patent Application Laid-open No. 63-155950.

The above method of using the shift register, however, has a drawback such that the weight coefficient is fixed to the fraction of the power of 2, so that a flexibility is small. In the method in which the value of the preliminarily weighted binary error is decided and the round error is added into the error which is distributed to the weighted peripheral pixels so as to equalize the total of the above values with the binary error, the average density of the output image is equal to the density of the input image. Since integer arithmetic operation is performed, however, the value of the round error itself is equal to 0 or is larger than at least 1, so that there is a drawback such that the picture quality deteriorates by the distribution of the round error in the highlighted portion which is easily influenced by the error.

Figure 6:
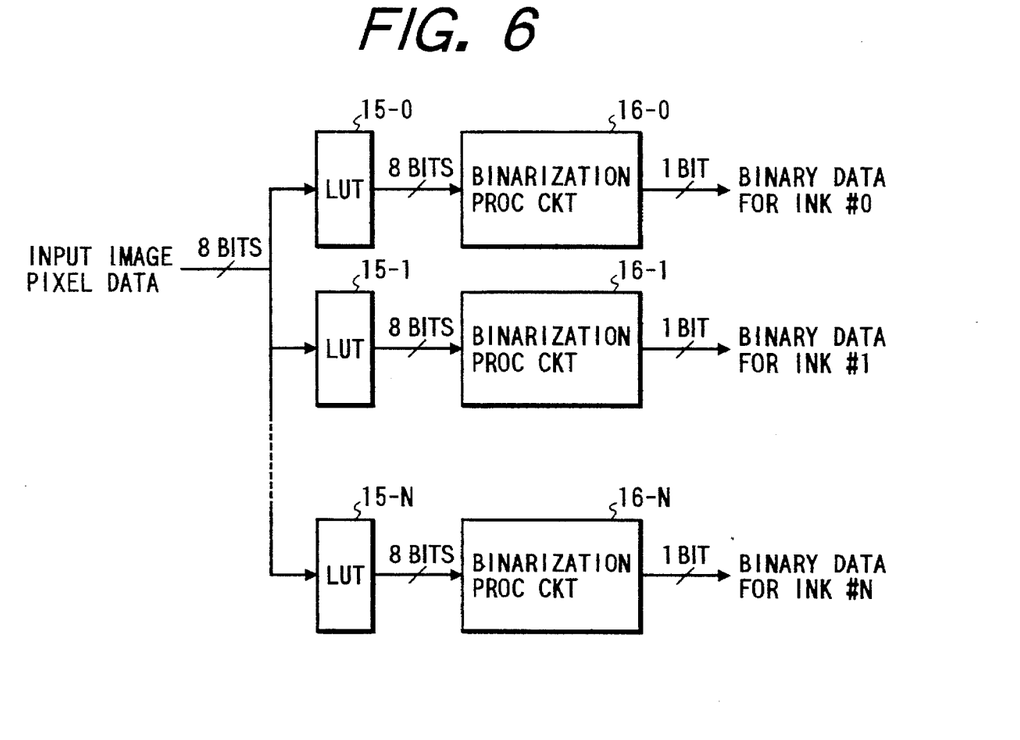
FIG. 6 is a schematic diagram showing a conventional correspondence to a plurality of inks.

Hitherto, a method of quantizing input multi-value data to data of three levels or more by using an error diffusion method is also known. In case of using such a method in an ink jet printer or the like which expresses a pseudo gradation by using a plurality of inks having the same hue and different densities, as shown in FIG. 6, it is necessary that the input image data is once inputted to look-up tables (LUTs) 15-0, 15-1, ..., and 15-N corresponding to the respective inks, and the densities are corrected and, after that, the data is inputted to binary processing circuits 16-0, 16-1, ..., 16-N, and a binarization process is executed to each ink. There is, consequently, a drawback such that when the number of kinds of inks increases, an amount of processes increases by an amount corresponding to the number of inks and the processing circuit is also enlarged in proportion to it. Further, there is a similar drawback in case of using those methods in recording means having the same kind of ink and a resolution of (N) times in the main scanning direction, recording means having the same resolution for recording twice at the same dot recording position, further, a multi-droplet method of recording by changing the dot diameter of the ink, or the like.

SUMMARY OF THE INVENTION

The present invention intends to eliminate the above-mentioned drawbacks of the conventional techniques. It is an object of the invention to provide an image processing method and apparatus which can improve a picture quality of, especially, a highlighted portion of an image by setting a value of a round error which occurs by weighting to error data to a value less than 1.

Another object of the invention is to provide an image processing method and apparatus in which a multiplier and a divider which are provided for every weight coefficient can be omitted, a circuit scale is small, namely, the operation can be performed at a high speed, a flexibility can be provided to the weight coefficient, and by setting a value of a round error itself to a value which lies within a range from 0 to less than 1, a picture quality can be improved.

According to the invention, the above-mentioned objects are accomplished by an image processing apparatus comprising: input means for inputting image data; processing means for quantizing the image data; and distributing means for weighting error data which occurs at the time of a quantizing process and for distributing the error data to a plurality of image data, wherein the distributing means sets a value of a round error which occurs by the weighting process to a value which lies within a range from 0 to less than 1.

According to the invention, there is provided an image processing method of distributing an error between the density of an input image and the density after binarization as a binary error to pixels around a target pixel, thereby equalizing the average density after the binarization with the density of the input image, wherein a table in which the value obtained by multiplying a denominator of a weight coefficient when the error is distributed has preliminarily been calculated is provided, the sum of the density of the input pixel which was multiplied by the denominator of the weight coefficient and the errors distributed from the peripheral pixels is obtained, a difference between the sum and the result of the binarization is divided by the denominator of the weight coefficient, the quotient and remainder are obtained, the quotient is distributed to the peripheral pixels on the basis of the value stored in the table, and the remainder is also distributed to the peripheral pixels.

Still another object of the invention is to provide an image processing method and apparatus in which when input image data is quantized to data of at least three levels, by setting a value of a round error which occurs by weighting to error data to a value that is equal to or larger than 0 and is less than 1, a picture quality of, especially, a highlighted portion of an image can be raised.

Further another object of the invention is to provide an image processing method and apparatus which can quantize input data to quantization data of at least three levels by an error diffusion method by a simple circuit construction.

Further another object of the invention is to provide an image processing method and apparatus in which a multiplier and a divider which are provided for every weight coefficient can be omitted, a circuit scale is small, namely, a processing speed is high, flexibility can be provided to a weight coefficient, picture quality can be improved by setting a value of a round error itself to a value which lies within a range from 0 to less than 1, and even in case of expressing a pseudo gradation by using a plurality of inks or dots, a quantizing process can be performed by a simple circuit.

According to the invention, the above-mentioned objects are accomplished by an image processing apparatus comprising: input means for inputting image data; processing means for quantizing the image data to the data of at least three levels; and distributing means for weighting error data which occurs at the time of a quantizing process and for distributing the error data to a plurality of image data, wherein the distributing means sets a value of a round error which occurs by weighting to a value which is equal to or larger than 0 and is less than 1.

According to the invention, there is provided an image processing method of distributing an error between the density of an input image and the density after the quantization as a quantization error to pixels around a target pixel and equalizing the average density after the quantization with the density of the input image, wherein a table in which the value of the error which is distributed to the peripheral pixel data and the value of the quantization data quantized to at least three levels have preliminarily been calculated is provided, the sum of the density of the input pixel multiplied by the denominator of a weight coefficient and the errors distributed from the peripheral pixels is obtained, the value stored in the table is selected on the basis of the sum, the error data is distributed to the peripheral pixels, and the quantization data quantized to at least three levels is outputted.

BRIEF DESCRIPTION OF THE DRAWINGS

FIG. 1 is comprised of FIGS. 1A and 1B, which are block diagrams showing a construction of an image processing apparatus of the first embodiment;

FIG. 4 is comprised of FIGS. 4A and 4B, which are block diagrams showing a construction of an image processing apparatus of the second embodiment;

FIG. 7 is comprised of FIGS. 7A and 7B, which are block diagrams showing a construction of the image processing apparatus of the first embodiment;

DETAILED DESCRIPTION OF THE PREFERRED EMBODIMENTS

[First Embodiment]

An embodiment of the invention will now be described in detail hereinbelow with reference to the drawings.

Figures 1, 1A:
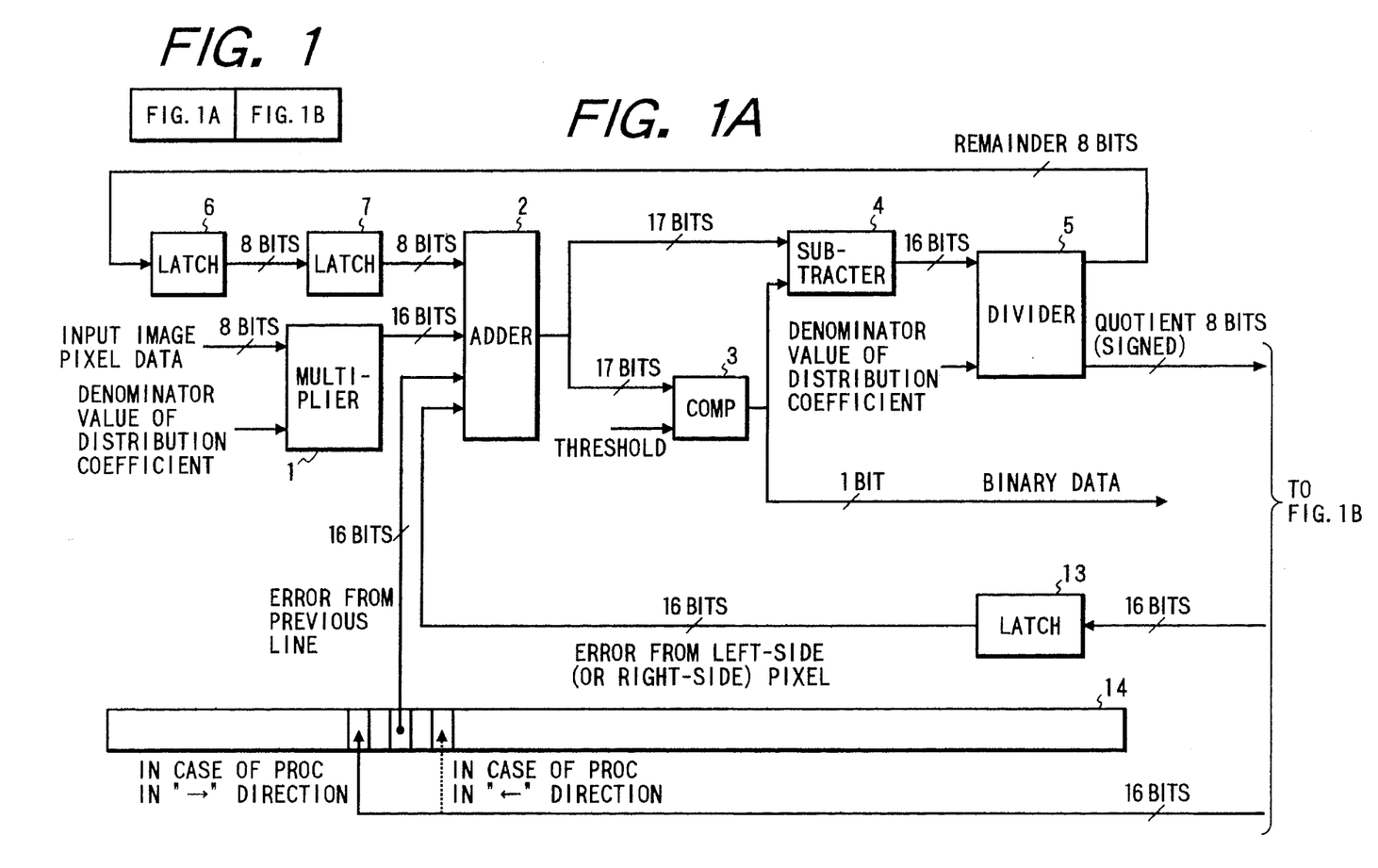
Figure 1B:
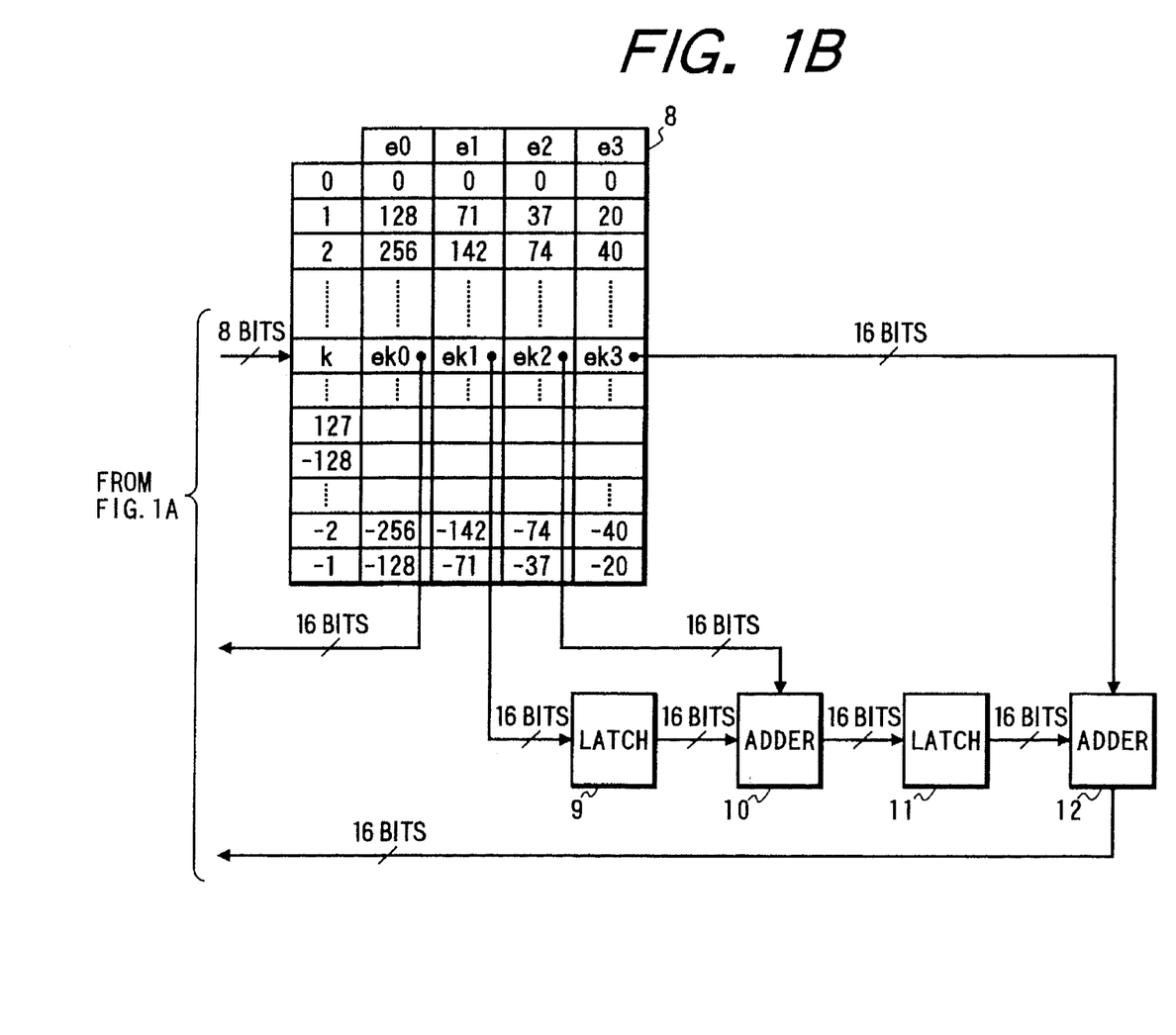

FIGS. 1A and 1B are block diagrams for explaining a construction of an image processing apparatus according to the first embodiment of the invention.

In FIG. 1A, reference numeral 1 denotes a multiplier. The multiplier 1 multiplies the value (256 in case of distribution coefficients of FIG. 3) of the denominator of a distribution coefficient when distributing an error to input data of eight bits. Reference numeral 2 denotes an adder for adding error data from a pixel which has already been subjected to a binarizing process to 16-bit data from the multiplier 1. Reference numeral 3 indicates a comparator for comparing 17-bit data from the adder 2 with the value (127×256) obtained by multiplying the value of the denominator of the distribution coefficient to "127" corresponding to the intermediate level of the input data of eight bits. Binary data of one bit from the comparator 3 is sent to an ink jet printer or a laser beam printer (not shown) and an image is formed by on/off of dots.

Reference numeral 4 denotes a subtracter for calculating a difference between the 17-bit data before binarization from the adder 2 and the value after the binarization, namely, error data. The binarized value which is used by the subtracter 4 is equal to "255×256" when the binarization result is equal to 1 and the binarized value is equal to "0" when the binarization result is equal to 0.

Reference numeral 5 indicates a divider for dividing 16-bit data from the subtracter 4 by the value of the denominator of a distribution coefficient and for outputting the (signed) quotient of eight bits and the remainder data of eight bits.

Reference numerals 6 and 7 denote latches for delaying the remainder data from the divider 5 one pixel by one. That is, the remainder 8-bit data from the latch 7 is added to the input data which is inputted after two pixels by the adder 2. Reference numeral 8 denotes an error distribution table in which the error data which is distributed to pixel positions shown in FIG. 2A has previously been stored for every value of the quotient data from the divider 5. For example, when the quotient is equal to 1 and the remainder is equal to 50, the error data 128 is distributed to e0, 71 to e1, 37 to e2, and 20 to e3. The error data of 50 is distributed to the next pixel on the right side of e0.

Reference numerals 9, 11, and 13 indicate latches for delaying data by one pixel. Reference numerals 10 and 12 denote adders which are used to add the error data. Reference numeral 14 denotes an error buffer which can store data of one line and is used to delay the error data by one line.

The circuit of FIGS. 1A and 1B switches a process in the "→" direction from the left to the right and a process in the "←" direction from the right to the left every line of the input data. As shown in FIGS. 1A and 1B, the storing position of the error data from the adder 12 to the error buffer 14 changes in dependence on the case of the process to the "→" direction or the case of the process to the "←" direction. The control is executed by a control circuit (not shown).

By executing a zig-zag process such that the processing direction is changed to the "→" direction and the "←" direction every line, the generation of a peculiar fringe pattern which causes a problem when the error diffusion method is executed can be prevented.

A flow of processing will now be described.

Figure 3:
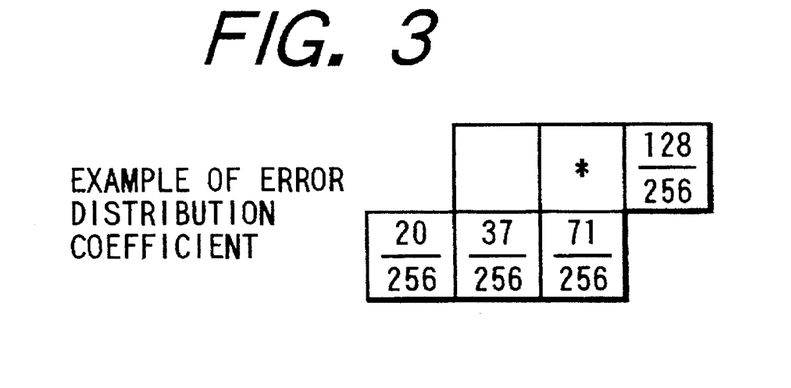
FIGS. 3 and 8 are schematic diagrams showing error distribution coefficients.

Input image pixel data which is inputted to the multiplier 1 is multi-value image data of eight bits. In the multiplier 1, the data is multiplied to the value of the denominator of the error distribution coefficient as shown in FIG. 3. Since the value of the denominator of the error distribution coefficient is equal to 256 in the embodiment, the value which is obtained by multiplying the input data by 256 is outputted from the multiplier 1 and is inputted to the adder 2. The adder 2 adds the input image data multiplied by the value of the denominator of the error distribution coefficient by the multiplier 1, a round error which is outputted from the latch 7, an error from the previous line read out from the next error buffer 14, and the error from the next pixel on the left side ("→" direction process) or the right side ("←" direction process) which is outputted from the latch 13 and outputs the resultant data. The data outputted from the adder 2 is inputted to the comparator 3. The comparator 3 compares the value outputted from the adder 2 with a predetermined threshold (127×256 in the embodiment). When the output of the adder 2 is larger than the threshold, the comparator 3 outputs "1". When the output of the adder 2 is equal to or smaller than the threshold, the comparator 3 outputs "0", and such an output value becomes binary data. The data outputted from the adder 2 and the data outputted from the comparator 3 are inputted to the subtracter 4, by which the latter data is subtracted from the former data. Since the data which is outputted from the adder 2 consists of 17 bits and the value which is outputted from the comparator 3 consists of one bit, the latter 1-bit data is bit expanded in the subtracter 4 and is further multiplied by the denominator of the error distribution coefficient. When the binary data is equal to 1, a binary error shown in the equations (1) is calculated by setting to (255×256) and when the binary data is equal to 0, it is similarly calculated by setting to 0. The binary error calculated by the subtracter 4 is inputted to the divider 5 and is divided by the value of the denominator of the distribution coefficient. The quotient, consequently, becomes an integer value and is used as a reference value for referring to the error distribution table 8. On the other hand, the remainder becomes a round error which is less than 1 and is inputted to the latch 6.

The remainder 8-bit data is equal to either one of the values 0 to 255 in this instance. Since the input data is multiplied by 256 by the multiplier 1, however, the remainder 8-bit data 0 to 255 becomes 0 to 255/256 for the input data of eight bits (0 to 255). The remainder 8-bit data is equal to a value less than 1 for the input data of eight bits. Thus, the value of the round error can be reduced and the picture quality, especially, in the highlighted portion of the image can be improved.

In the case where the value obtained by dividing the data from the subtracter 4 by the value of the denominator of the distribution coefficient is equal to 1.5, the divider 5 outputs the value of −2 as a quotient and +128 as a remainder. That is, the remainder data never becomes a negative value.

Figure 2A:
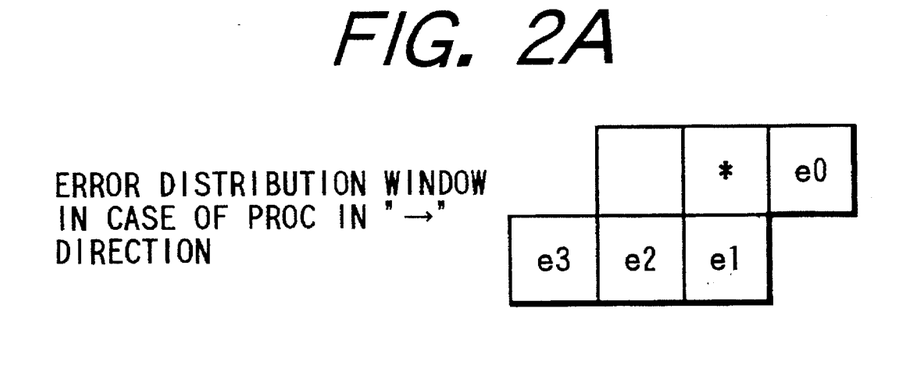
FIGS. 2A and 2B are schematic diagrams showing error distribution windows.
Figure 2B:
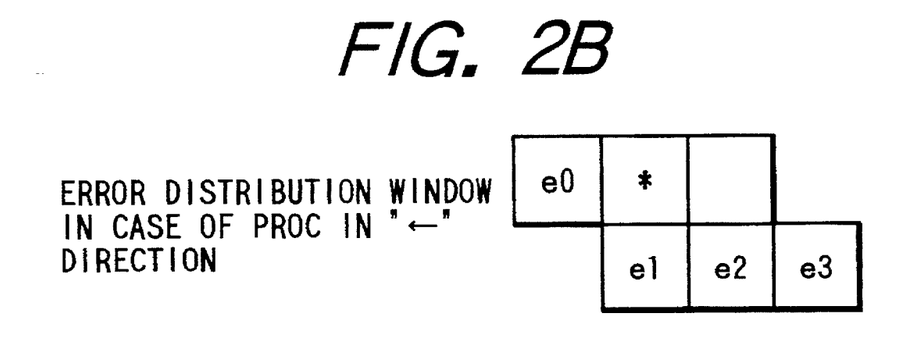

After a delay of two pixels was given to the remainder 8-bit data by the latch 6 or 7, the delayed data is again inputted to the adder 2. The quotient which is outputted from the divider 5 is inputted to the error distribution table 8 as a reference value. The error distribution table 8 is a look-up table constructed by a RAM (random access memory) or a ROM (read only memory). The value multiplied by the denominator of a predetermined weight coefficient is stored in the table 8 for every value of the binary error. The values corresponding to error distribution windows as shown in FIGS. 2A and 2B have been stored in the error distribution table 8. Since each value is multiplied by the denominator of the error distribution coefficient in accordance with the value of the binary error, each value is expressed by the numerical value of 16 bits. Although two error distribution windows which are symmetrical with respect to the right and left as shown in FIGS. 2A and 2B are switched every line in accordance with the processing direction in the embodiment, since the error distribution windows are symmetrical with respect to the right and left, it is sufficient to provide one error distribution table.

Four values of ek0, ek1, ek2, and ek3 are outputted from the error distribution table 8 in accordance with the value of a binary error (k). Those values correspond to the values to error distribution windows e0, e1, e2, and e3 as shown in FIGS. 2A and 2B. Therefore, an output ek0 is inputted to the latch 13 and is delayed by the time of one pixel and, after that, the delayed data is again inputted to the adder 2. An output ek1 is inputted to the latch 9 and is delayed by the time of one pixel and, after that, delayed data is inputted to the adder 10 and is added to an output ek2. Further, an output of the adder 10 is inputted to the latch 11 and is delayed by the time of one pixel and, after that, the delayed data is inputted to the adder 12 and is added to an output ek3. An output of the adder 12 is written in the error buffer 14. In the embodiment, the location at which the error is written is a position which is away from the target pixel by two pixels to the right or left in dependence on the direction of the binarization. The binarizing direction is switched every line.

Since the binarizing process for one input data is finished by the above processes, by repeating the above processes while deviating the processing direction one pixel by one, the binarizing process for the whole image can be executed.

According to the first embodiment of the invention as mentioned above, since the value of the binary error multiplied by the denominator of the weight coefficient has preliminarily been calculated and stored in the table, the multiplier and divider which are provided for every weight coefficient can be omitted, the circuit scale can be reduced, and the processes can be performed at a high speed. Further, the sum of the density of the input pixel and the errors distributed from the peripheral pixels is obtained, the difference between the sum and the binarization result is divided by the denominator of the weight coefficient, the quotient and remainder are obtained, the quotient is distributed to the peripheral pixels on the basis of the value stored in the table, and the remainder is also distributed to the peripheral pixels. Thus, the weight coefficient can have flexibility, the value of the round error can be set to a value within a range from 0 to less than 1, and the picture quality including the highlighted portion can be improved.

[Second Embodiment]

Figures 4, 4A:
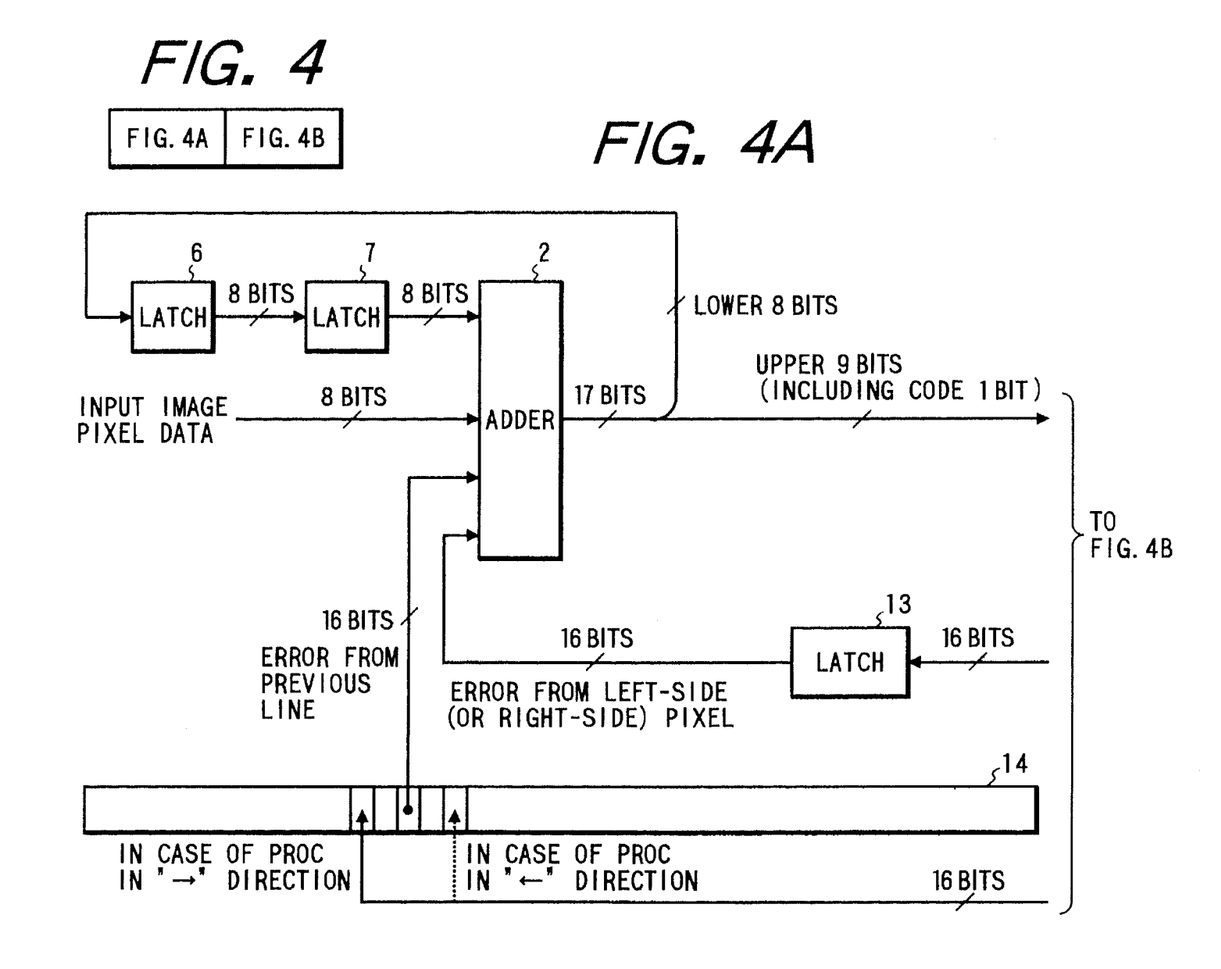
Figure 4B:
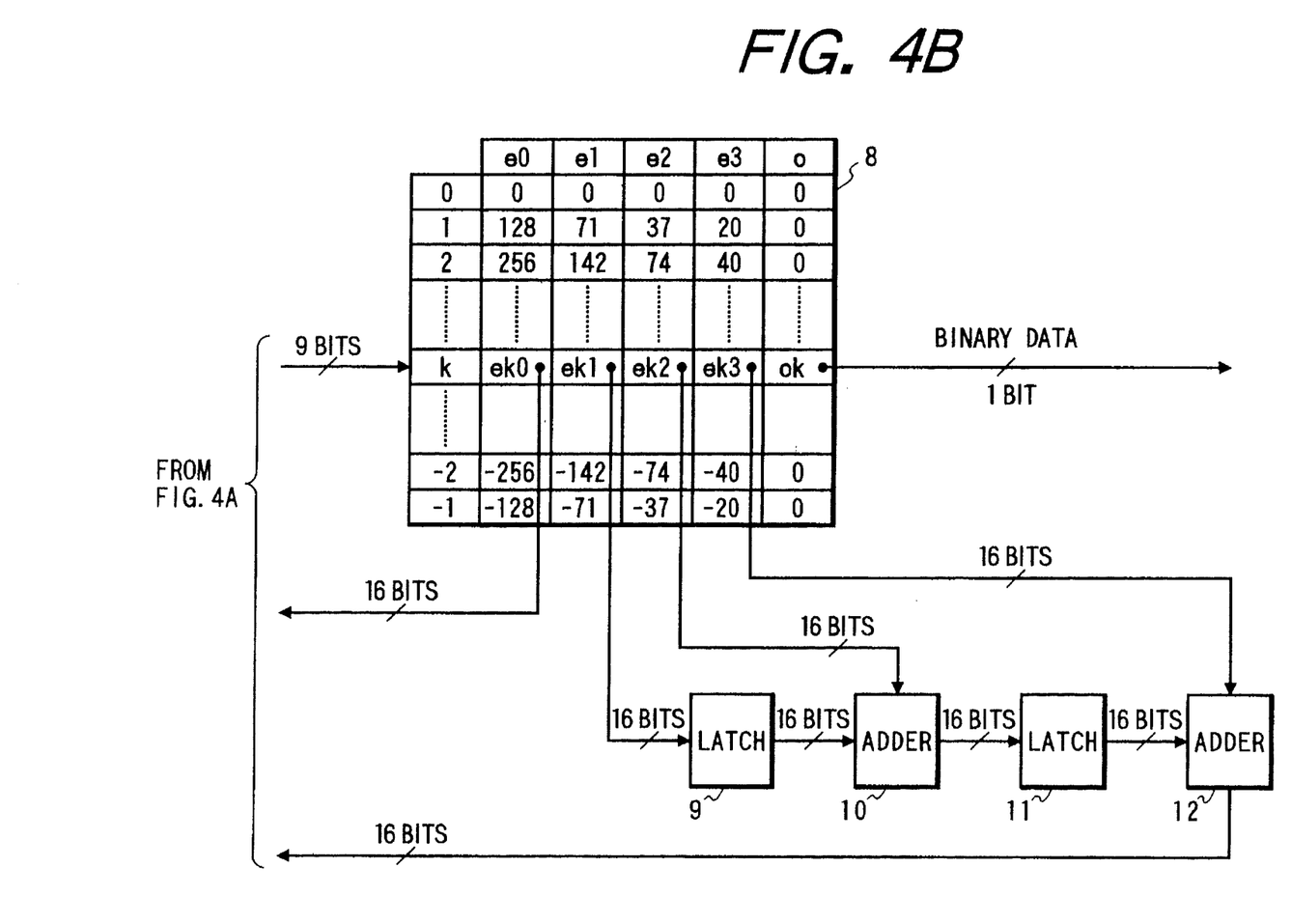

FIGS. 4A and 4B are block diagrams for explaining a construction of an image processing apparatus according to the second embodiment of the invention.

In the first embodiment, since the error distribution coefficient as shown in FIG. 3 is used, the value of the denominator of the error distribution coefficient is equal to the power of 2. Therefore, since the multiplier 1 and divider 5 of the first embodiment can be replaced by a bit shift arithmetic operation, they can be omitted. FIGS. 4A and 4B are diagrams which are obtained by omitting the multiplier 1 and divider 5 from FIG. 1. That is, the 8-bit input data is inputted from bit 8 to bit 15 of the adder 2. In the arithmetic operation result of the adder 2, the upper nine bits including a code bit correspond to the quotient and the code bit and the lower eight bits correspond to the remainder. The upper nine bits which are outputted from the adder 2 are referred to in the error distribution table. As will be obviously understood from the equations (1), the binary error can be obtained from the values of the upper nine bits from the adder 2 without referring to the error data. Therefore, by previously forming the corresponding error distribution table, there will be no problem even when the table is referred by the values of the upper nine bits from the adder 2. Further, since the binary data (o) has also been registered in the error distribution table 8, the comparator 3 in the first embodiment can be also omitted by referring to the binary data (o).

Figure 5:
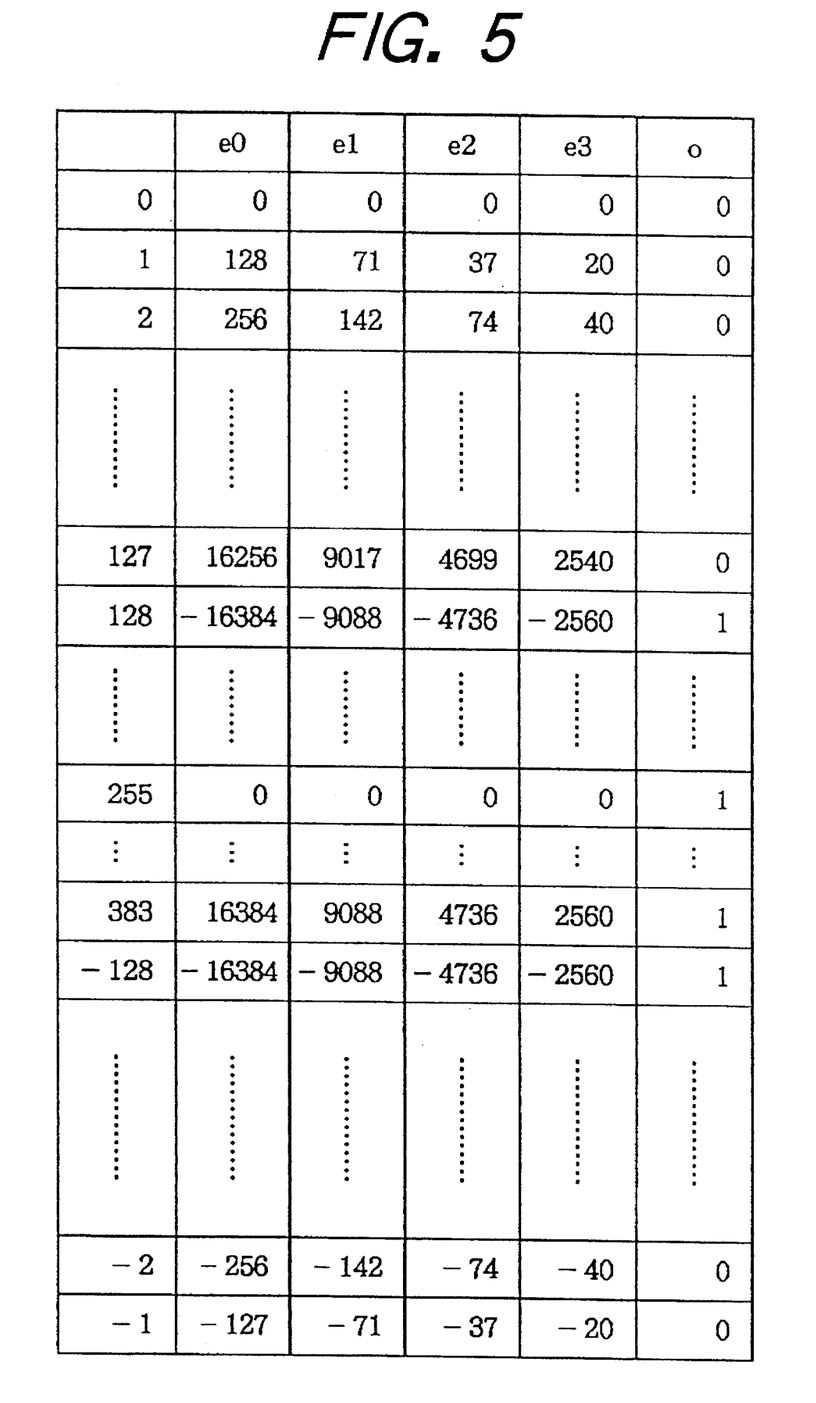
FIG. 5 is a diagram showing the details of an error distribution table of the second embodiment.

FIG. 5 shows the error distribution table shown in FIGS. 4A and 4B in more details.

According to the second embodiment as mentioned above, the circuit scale is reduced and the error diffusing process can be executed at a high speed without using the multiplier, divider and comparator and, further, the weight coefficient can also have flexibility. Moreover, the round error which occurs when the error is distributed can be suppressed to a value with a range from 0 to less than 1, and the picture quality in the highlighted portion can be improved.

Although the input image pixel data in the embodiment as mentioned above is the multi-value image data of eight bits, the data can be also expressed by a large number of bits such as 4 bits, 12 bits, 16 bits, or the like. The invention can be also applied to the case where the 8-bit input data is quantized to data of two or three bits.

An example in which the 8-bit input data is quantized to 2-bit data will now be described hereinbelow.

[Third Embodiment]

The third embodiment of the invention will now be described in detail hereinbelow with reference to the drawings.

Figures 7, 7A:
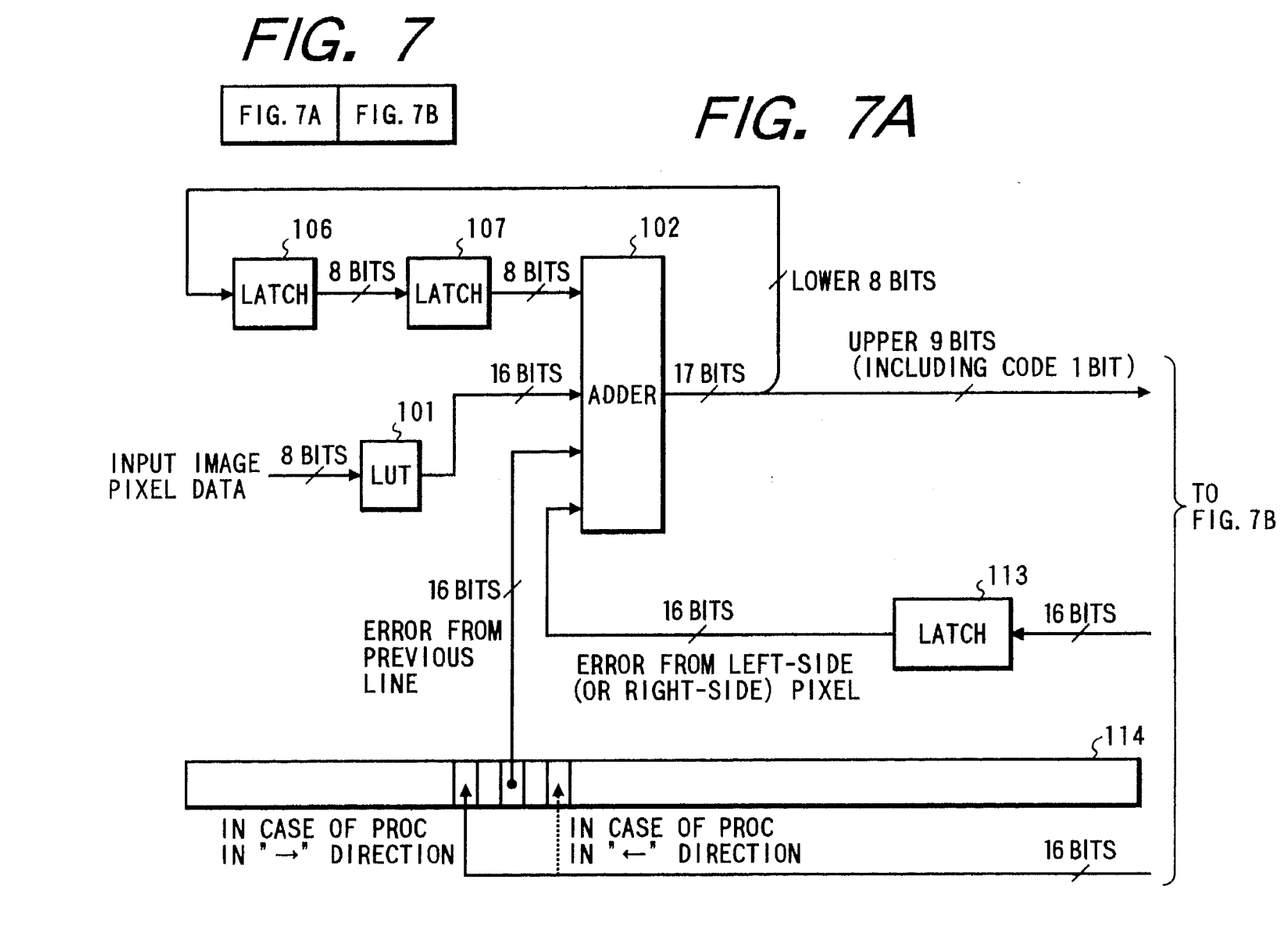
Figure 7B:
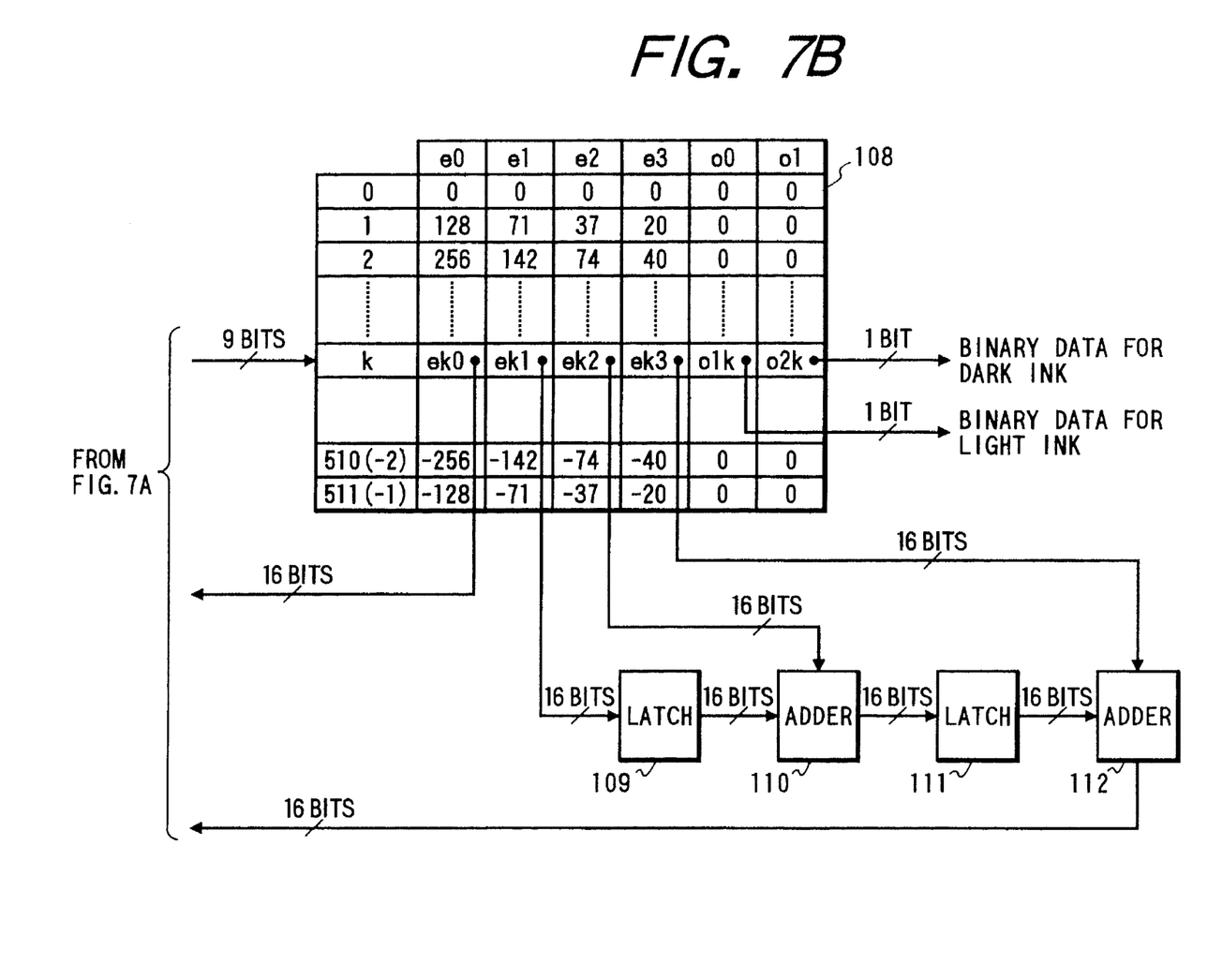

FIGS. 7A and 7B are block diagrams for explaining a construction of an image processing apparatus according to the third embodiment of the invention.

In the third embodiment of the invention, an example in which a pseudo gradation is expressed by using inks of two light and dark colors, namely, an example in which the input image data is quantized to three levels will be explained. The invention can be also applied to the case of quantizing the input image data to four or more levels.

In FIGS. 7A and 7B, input image pixel data which is inputted from the left is multi-value image data of eight bits and is first inputted to a look-up table (LUT) 101. The LUT 101 is a table for compensating a linearity of an output for the input data which is subjected to a pseudo gradation process, and outputs the value of 16 bits for the input value of eight bits.

Further, in the LUT 101, the input data is multiplied by the value (256 in case of the distribution coefficients of FIG. 8) of the denominator of the distribution coefficient for distributing the error. Reference numeral 102 denotes an adder for adding error data from the pixel which has already been quantized to three levels to the 16-bit data from the LUT 101.

A round error (error of the remainder which is generated when the error is distributed) which is outputted from a latch 107, an error from the previous line which was read out from an error buffer 114, and an error from next pixel on the left side or right side which is outputted from a latch 113 are added to the 16-bit data from the LUT 101 by the adder 102.

Figure 8:
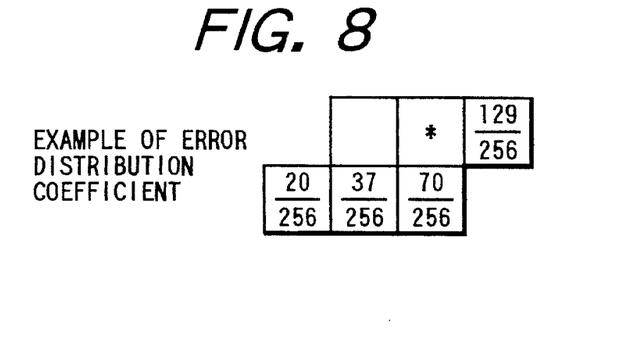

The error distribution coefficients as shown in FIG. 8 are used in the embodiment. The numerical value of the denominator of the error distribution coefficient is set to the power of 2 (the eighth power of 2). The data from the adder 102 is divided by the value of the denominator of the distribution coefficient. The division is performed by a bit shifting process. In the arithmetic operation result of the adder 102, the upper nine bits including the code bit correspond to the quotient when the data from the adder 102 is divided by the eighth power of 2 and the code bit and lower eight bits correspond to the remainder when the data from the adder 102 is divided by the eighth power of 2.

The quotient (upper nine bits from the adder 102), consequently, is used as a reference value for referring to an error distribution table 108. On the other hand, the remainder (lower eight bits from the adder 102) is inputted to a latch 106 as a round error of a value which is less than 1.

The error distribution table 108 refers to the upper nine bits which are outputted from the adder 102. As will be understood from the equations (1), since the values of Vmax and Vmin have been determined, the quantization error can be obtained from the value of input data (V). Therefore, it can be obtained from the values of the upper nine bits from the adder 102.

The latches 106 and 107 are provided to distribute the round error to the pixels out of the pixels shown by the error distribution table. After a delay of two pixels was given, the delayed data is again inputted to the adder 102. The quotient of the upper nine-bit data which is outputted from the adder 102 is inputted to the error distribution table 108 as a reference value. The error distribution table 108 is a look-up table constructed by a RAM (random access memory) or a ROM (read only memory). The value multiplied by the denominator of the predetermined weight coefficient for every value of the quantization error and the binary data corresponding to each of the light and dark inks have been stored in the table 108. Since the values corresponding to the error distribution windows as shown in FIGS. 2A and 2B have been stored in the error distribution table 108 and each value has been multiplied by the denominator of the error distribution coefficient in accordance with the value of the quantization error, each value is expressed by the numerical value of 16 bits.

Although two error distribution windows which are symmetrical with respect to the right and left as shown in FIGS. 2A and 2B are switched every raster in accordance with the processing direction and are used in a manner similar to the first and second embodiments, since the error distribution windows are symmetrical with respect to the right and left, it is sufficient to provide one error distribution table. Four values of ek0, ek1, ek2, and ek3 are outputted from the error distribution table 108 in accordance with the value of the quotient which is outputted from the adder 102. Those values correspond to the values of e0, e1, e2, and e3 of the error distribution windows as shown in FIGS. 2A and 2B. The output ek0 is inputted to the latch 113 and is delayed by the time of one pixel and, after that, the delayed data is again inputted to the adder 102. The output ek1 is inputted to a latch 109 and is delayed by the time of one pixel and, after that, the delayed data is inputted to an adder 110 and is added to the output ek2. An output of the adder 110 is supplied to a latch 111 and is delayed by the time of one pixel and, after that, the delayed data is sent to an adder 112 and is added to the output ek3. An output of the adder 112 is written in the error buffer 114.

For example, when the quotient as upper nine-bit data from the adder 102 is equal to 1 and the remainder data as lower eight bits data is equal to 50, error data of 128 is distributed to e0, 71 to e1, 37 to e2, and 20 to e3 and the error data of 50 is distributed to the pixel next to e0 on the right side.

In the embodiment, the location at which the error is written is a position which is away from the target pixel by two pixels to the right or left in dependence on the direction of the quantization. The direction of the quantizing process is switched every raster.

That is, the circuit of FIGS. 7A and 7B switches the process in the "→" direction from the left to the right and the process in the "←" direction from the right to the left every line of the input data. As shown in FIGS. 7A and 7B, the storing position of the error data from the adder 112 to the error buffer 114 changes in dependence on the case of the process to the "→" direction or the case of the process to the "←" direction. The control is executed by a control circuit (not shown).

By executing a zig-zag process such that the processing direction is changed to the "→" direction and the "←" direction every line, the generation of a peculiar fringe pattern which causes a problem when the error diffusion method is executed can be prevented.

Data after the quantization has preliminarily been stored in the error distribution table 108 in accordance with the values of the upper nine bits of the adder 102, values o0 and o1 are outputted in accordance with the value of the quotient of the upper nine bits which is outputted from the adder 102 and those values correspond to the binary data corresponding to the light and dark inks.

An image is formed on the basis of the binary data corresponding to the light and dark inks by an ink jet printer (not shown).

Since the pseudo gradation process for one input data is finished by the above processes, by repeating the above processes while deviating the processing direction one pixel by one, the pseudo gradation process for the whole image can be executed.

Figure 9:
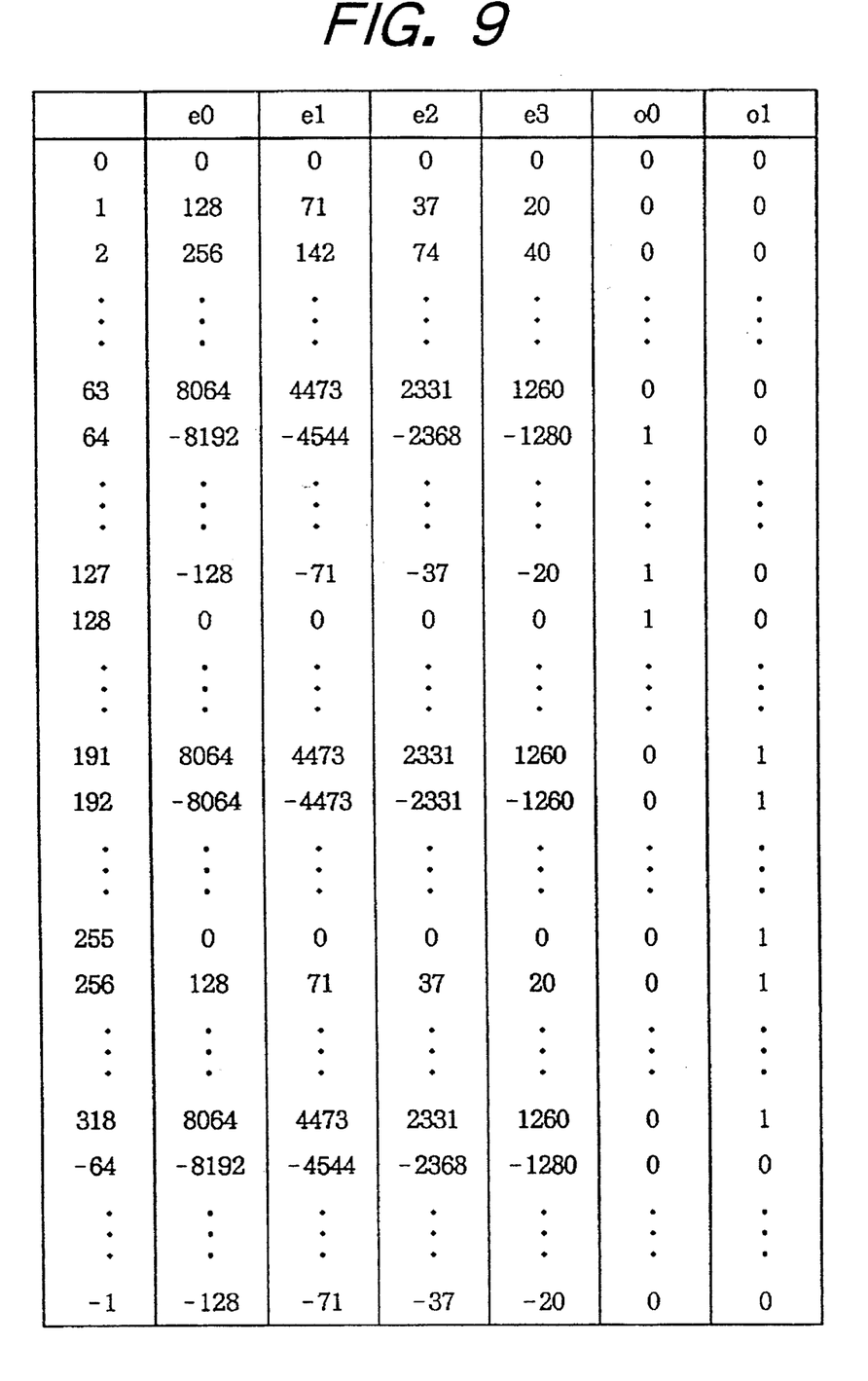
FIG. 9 is a diagram showing the details of an error distribution table of the third embodiment.

FIG. 9 shows the error distribution table 108 in more details.

According to the embodiment as mentioned above, when the input data is quantized to at least three levels, since the quantization results have preliminarily been stored in the table as shown in FIG. 6, the quantizing process to three levels or more by the error diffusion method can be realized by a simple circuit construction without performing the binarizing process every level.

Further, although the lower eight-bit data from the adder 102 in the embodiment is set to either one of the values 0 to 255, since the input data has been multiplied by 256 by the LUT 101, the remainder 8-bit data 0 to 255 becomes 0 to 255/256 for the input data of eight bits (0 to 255). The remainder 8-bit data is set to a value less than 1 for the input data of eight bits. Thus, the value of the round error can be reduced and the picture quality, especially, in the highlighted portion of the image can be improved.

According to the third embodiment of the invention as mentioned above, since the value of the binary error multiplied by the denominator of the weight coefficient and the quantization data quantized to at least three levels have preliminarily been calculated and stored in the table, the multiplier and divider which are provided for every weight coefficient can be omitted, the circuit scale can be reduced, and the processes can be performed at a high speed. Further, the sum of the density of the input pixel and the errors distributed from the peripheral pixels is obtained, the error value stored in the table is selected on the basis of the sum and is distributed to the peripheral pixels, and the remainder is also distributed to the peripheral pixels. Thus, the weight coefficient can have flexibility, the value of the round error can be set to a value within a range from 0 to less than 1, and the picture quality including the highlighted portion can be improved.

[Fourth Embodiment]

Figure 10:
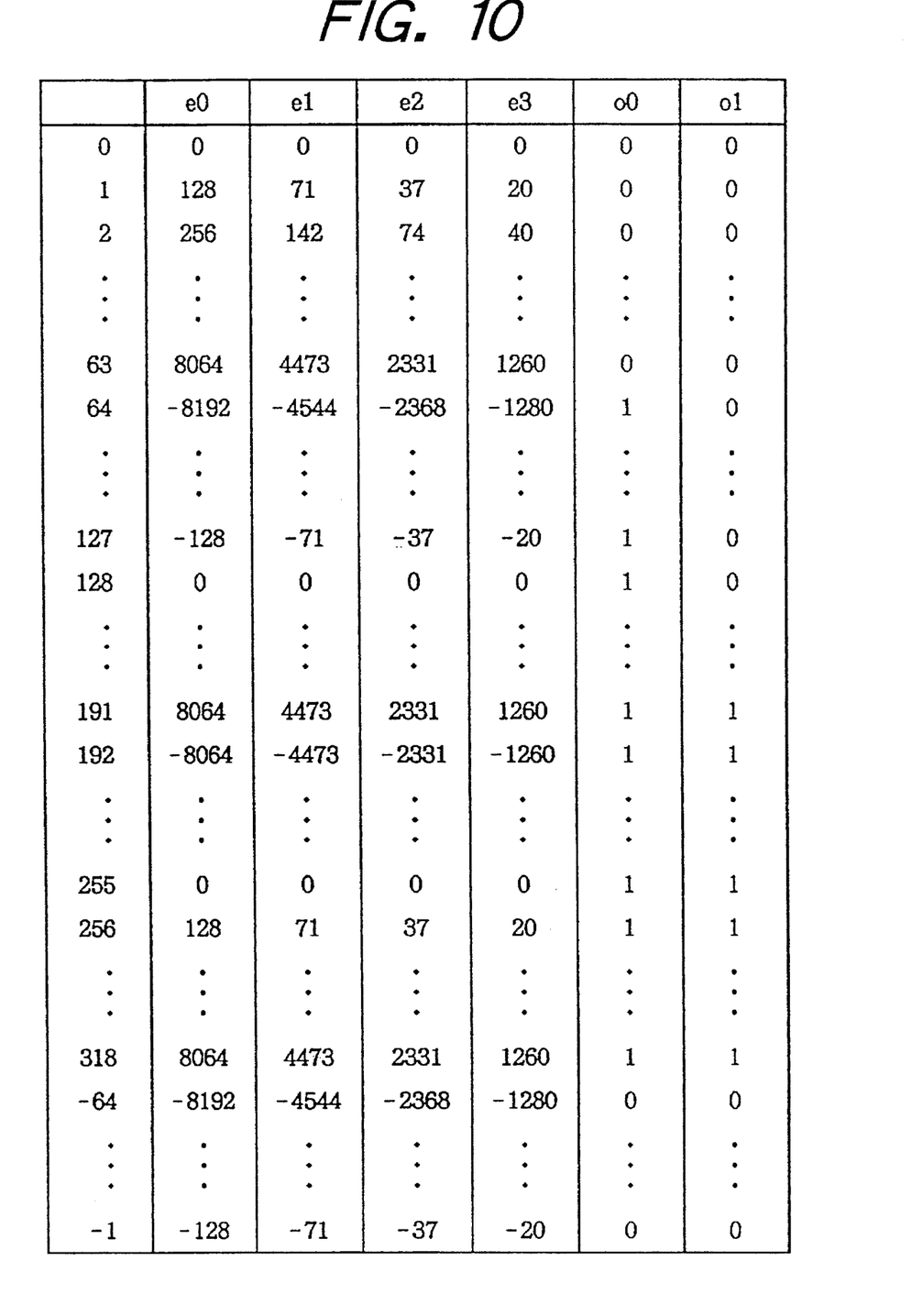
FIG. 10 is a diagram showing an error distribution table of the fourth embodiment.

FIG. 10 is a diagram for explaining in detail the error distribution table 108 according to the fourth embodiment of the invention. In the fourth embodiment, a circuit construction of an image processing apparatus is fundamentally the same as that of FIGS. 7A and 7B of the third embodiment except a different point in that the contents of the error distribution table and those of recording means are different. That is, in the third embodiment, the recording means for recording by using two kinds of dark and light inks having different densities has been presumed. In the fourth embodiment, recording means using the same kind of ink and having a resolution of (N) times (N=2 in the second embodiment) in the main scanning direction, or recording means having the same resolution and for recording twice at the same dot recording position, is presumed. Therefore, the binary data table annexed to the error distribution table of FIG. 10 is constructed so that both of the outputs o0 and o1 are set to 1 in the high density region, namely, when the value of the quotient of the upper nine bits which is outputted from the adder 102 lies in a range from 191 to 318.

When the recording resolution in the main scanning direction is twice as high as the input resolution, the recording is executed at the double resolution by using two outputs in FIG. 10 for the input data of one pixel.

In case of recording twice at the same dot recording position, the recording is performed by using two outputs in FIG. 10 for the input data of one pixel.

By using the construction as mentioned above, the data which is used for recording for the recording means having the same kind of ink and having the resolution of (N) times in the main scanning direction, or the recording means having the same resolution and for recording twice at the same dot recording position, can be easily obtained without changing the fundamental construction of the image processing apparatus of the embodiment 3.

In the first to fourth embodiments as mentioned above, although the input image pixel data is the multi-value image data of eight bits, the data can be also expressed by a large number of bits such as 4 bits, 12 bits, 16 bits, or the like.

Although the error distribution window has been constructed by four pixels in the first to fourth embodiments, the invention can be also similarly constructed by a larger or smaller window.

Although two kinds of data of light and dark or two dots have been used as binary data which is outputted in the embodiments 3 and 4, when the recording is executed by using a larger number of inks or dots or the recording is performed by using a multi-droplet method, such a recording can be also easily performed by merely expanding the binary data table annexed to the error distribution table.

Further, although the embodiments have been described with respect to merely the multi-value image data of eight bits, the invention can be also constructed as a color image processing apparatus for inputting color multi-value image data of (N) bits for each of R, G, and B.

According to the third and fourth embodiments of the invention as explained above, the value of the binary error multiplied by the denominator of the predetermined weight coefficient and the quantization data have preliminarily been calculated and stored in the table for every value of the density information, the sum of the density of the target pixel and the errors distributed from the peripheral pixels is obtained and, after that, the value of the sum is divided (bit shifted) by the denominator of the weight coefficient and the remainder is obtained, thereby enabling the round error to be set to a value within a range from 0 to less than 1. Therefore, the weight coefficient can have flexibility, the circuit scale can be reduced by omitting the multiplier and divider which are provided for every weight coefficient, the processes can be performed at a high speed, and the picture quality of a highlighted portion can be improved. Further, even when the pseudo gradation expressing process is executed by the recording means for performing the pseudo gradation expression by using a plurality of inks having the same hue and different densities, the recording means having the same kind of ink and the resolution of (N) times in the main scanning direction, or the recording means having the same resolution and for recording a plurality of times at the same dot recording position, and further, by the multi-droplet method, or the like, the pseudo gradation expressing process can be realized without adding a processing circuit of a large scale.

Although the invention has been described by the preferred embodiments, the invention is not limited to the foregoing embodiments but many various modifications are possible within the spirit and scope of the appended claims of the invention.

What is claimed is:

1. An image processing apparatus comprising:

input means for inputting image data;

processing means for quantizing the image data;

calculating means for obtaining error data generated in the quantizing process;

distributing means for weighting the error data obtained by the calculation of said calculating means and for distributing the weighted error data to a plurality of image data; and setting means for setting a value of a round error which occurs by the weighting process to a value which lies within a range from 0 to less than 1, wherein the round error is a value which is obtained by subtracting the weighted error data to be distributed to the plurality of image data, from the error data obtained by said calculating means.

2. An image processing method of distributing an error between a density of an input image and the density after binarization as a binary error to pixels around a target pixel, thereby equalizing an average density after the binarization with the density of the input image, comprising:

an apparatus-implemented first step of multiplying a predetermined value to input image data;

an apparatus-implemented second step of adding error data to the data obtained in said first step;

an apparatus-implemented third step of dividing the value obtained in said second step by the predetermined value; and an apparatus-implemented fourth step of obtaining the error data which has preliminarily been stored in a table for a plurality of peripheral pixels on the basis of the value obtained in said third step.

3. A method according to claim 2, wherein the predetermined value is a value of a denominator of a weight coefficient when the error is distributed.

4. A method according to claim 3, wherein the value of the denominator of the weight coefficient is the power of 2.

5. A method according to claim 2, further comprising a fifth step of comparing the value obtained in said second step with a threshold, thereby binarizing the input image data.

6. A method according to claim 2, wherein in said third step, the value obtained in said second step is divided by the predetermined value, thereby obtaining a quotient and a remainder, and in said fourth step, the error data stored in the table is obtained on the basis of the quotient obtained in said third step.

7. A method according to claim 6, further comprising a sixth step of distributing the remainder obtained in said third step and the error data obtained in said fourth step to the peripheral pixels.

8. An image processing apparatus comprising:

input means for inputting image data;

processing means for quantizing the image data to data of at least three levels;

calculating means for obtaining error data generated in the quantizing process;

distributing means for weighting the error data obtained by the calculation of said calculating means and for distributing the weighted error data to a plurality of image data; and setting means for setting a value of a round error which occurs by weighting to a value which is equal to or larger than 0 and is less than 1, wherein the round error is a value which is obtained by subtracting the weighted error data to be distributed to the plurality of image data, from the error data obtained by said calculating means.

9. An image processing method of distributing an error between a density of an input image and the density after quantization as a quantization error to pixels around a target pixel and equalizing an average density after the quantization with the density of the input image, comprising:

an apparatus-implemented first step of multiplying input image data by a predetermined value;

an apparatus-implemented second step of adding error data to the data obtained in said first step; and an apparatus-implemented third step of outputting the error data and the quantized quantization data which have preliminarily been stored in a table on the basis of the data obtained in said second step.

10. A method according to claim 9, wherein the quantization data which has preliminarily been stored in the table and has been quantized to at least three levels is outputted in said third step.

11. A method according to claim 9, wherein the predetermined value is a value of a denominator of the weight coefficient when the error is distributed.

12. A method according to claim 11, wherein the value of a denominator of the weight coefficient is the power of 2.

13. A method according to claim 9, wherein in said third step, the error data and the quantization data which have been stored in said table are selected and outputted on the basis of upper plural-bit data of the data obtained in said second step.

14. A method according to claim 13, further comprising a fourth step of distributing lower plural-bit data of the data obtained in said second step to a plurality of peripheral pixels as a remainder error.

* * * * *

UNITED STATES PATENT AND TRADEMARK OFFICE
CERTIFICATE OF CORRECTION

PATENT NO. : 5,621,542
DATED : April 15, 1997
INVENTOR(S) : TAKATOSHI OHTA, ET AL.

It is certified that error appears in the above-identified patent and that said Letters Patent is hereby corrected as shown below:

COLUMN 1

Line 17, "half tone" should read --half-tone--.

COLUMN 2

Line 54, "to" should be deleted.

COLUMN 3

Line 29, "to" should be deleted. (1st Occur.)

COLUMN 12

Line 50, "process:" should read --process;--.

Signed and Sealed this

Twenty-fifth Day of November, 1997

Attest:

BRUCE LEHMAN

Attesting Officer   Commissioner of Patents and Trademarks